(12) United States Patent
Sadowski et al.

(10) Patent No.: US 9,417,679 B2
(45) Date of Patent: Aug. 16, 2016

(54) ADAPTIVE CONNECTED STANDBY FOR A COMPUTING DEVICE

(71) Applicants: Greg Sadowski, Cambridge, MA (US); Alexander J. Branover, Chestnut Hill, MA (US); Maurice B. Steinman, Marlborough, MA (US)

(72) Inventors: Greg Sadowski, Cambridge, MA (US); Alexander J. Branover, Chestnut Hill, MA (US); Maurice B. Steinman, Marlborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 604 days.

(21) Appl. No.: 13/674,476

(22) Filed: Nov. 12, 2012

(65) Prior Publication Data

US 2014/0136869 A1  May 15, 2014

(51) Int. Cl.
*G06F 1/32* (2006.01)

(52) U.S. Cl.
CPC .......... *G06F 1/3212* (2013.01); *G06F 1/3287* (2013.01); *Y02B 60/1282* (2013.01); *Y02B 60/1292* (2013.01)

(58) Field of Classification Search
CPC ............. G06F 1/00; G06F 1/04; G06F 1/12; G06F 1/26; G06F 1/32; G06F 11/30; G06F 15/16
USPC ................................ 713/300, 310, 330, 340
See application file for complete search history.

(56) References Cited

U.S. PATENT DOCUMENTS

| | | | | |
|---|---|---|---|---|
| 6,404,653 | B1 * | 6/2002 | Chitsazan et al. | 363/16 |
| 7,868,591 | B2 * | 1/2011 | Phillips et al. | 320/114 |
| 7,895,309 | B2 * | 2/2011 | Belali et al. | 709/223 |
| 8,060,053 | B2 * | 11/2011 | Hirsch | 455/343.2 |
| 2007/0162582 | A1 | 7/2007 | Belali et al. | |
| 2009/0289601 | A1 * | 11/2009 | Kanade et al. | 320/135 |
| 2012/0131367 | A1 | 5/2012 | Kamijima | |
| 2012/0319481 | A1 * | 12/2012 | Cong | 307/39 |
| 2013/0212413 | A1 * | 8/2013 | Berndt et al. | 713/310 |
| 2014/0075220 | A1 * | 3/2014 | Song | 713/320 |

OTHER PUBLICATIONS

PCT/US2013/066800 International Search Report mailed May 16, 2014.
Microsoft; *Connected standby SleepStudy common problem examples*; https://msdn.microsoft.com/en-us/library/windows/hardware/dn495348(v=vs.85).aspx; 2015; pp. 1-3.
Microsoft; *Connected standby SleepStudy*; https://msdn.microsoft.com/en-us/library/windows/hardware/dn495346(v=vs.85).aspx; 2015; pp. 1-2.
Wkipedia; *InstantGo*; https://en.wikipedia.org/wiki/InstantGo; Jul. 6, 2014; pp. 1-3.

(Continued)

*Primary Examiner* — Thomas Lee
*Assistant Examiner* — Mohammad A Rahman
(74) *Attorney, Agent, or Firm* — Timothy M. Honeycutt

(57) ABSTRACT

Various computing devices and methods of managing the power consumption thereby are disclosed. In one aspect, a method of managing power consumption of a computing device that has a battery is provided. The method includes cycling the computing device between a connected standby active state and a connected standby idle state. The duration of the connected standby idle state is set based at least in part on a charge level of the battery.

17 Claims, 5 Drawing Sheets

(56) References Cited

OTHER PUBLICATIONS

Microsoft; *Introduction to connected standby*; https://msdn.microsoft.com/en-us/library/windows/hardware/dn481224(v=vs.85).aspx; 2015; pp. 1-2.

Microsoft; *What is connected standby?*; https://msdn.microsoft.com/en-us/library/windows/hardware/dn481238(v=vs.85).aspx; 2015; pp. 1-2.

Microsoft; *Connected Standby*; https://msdn.microsoft.com/library/windows/hardware/dn481216; 2015; pp. 1-2.

\* cited by examiner

000# ADAPTIVE CONNECTED STANDBY FOR A COMPUTING DEVICE

BACKGROUND OF THE INVENTION

1. Field of the Invention

This invention relates generally to computing devices and software, and more particularly to managing a connected standby state for a computing device.

2. Description of the Related Art

Battery operated devices, such as portable computers and smart phones, rely on battery power when not connected to source of external power, such as an AC source. Modern portable computing devices may be capable of simultaneously running many power hungry applications and components, such as disk drives, communications radios (WiFi, WAN etc.) displays and others. Power conservation, even in the face of these power consuming programs and components, remains a technical goal since the need for more frequent battery recharges can reduce user satisfaction.

The inventors have recognized one known technique used for battery power is to place the computing device into a connected standby state. The connected-standby state can be described as periodic waking up of the computing device, restoring the basic state required to establish network connectivity and allow various applications to access their remote servers and update data on the local device as well as the remote state. Conventional connected-standby control algorithms use a few fixed battery threshold levels to guide their behavior, which means that until the battery charge goes down to some critical level, the control behavior is exactly the same. When the battery hits the critical level, the behavior changes rapidly to only minimal periodical network connectivity before shutting down completely when battery discharges to an "alarm" level. The main problem is that the control algorithm remains the same throughout the wide range of battery charge levels and other environmental circumstances.

The present invention is directed to overcoming or reducing the effects of one or more of the foregoing disadvantages.

SUMMARY OF EMBODIMENTS OF THE INVENTION

In accordance with one aspect of an embodiment of the present invention, a method of managing power consumption of a computing device that has a battery is provided. The method includes cycling the computing device between a connected standby active state and a connected standby idle state. The duration of the connected standby idle state is set based at least in part on a charge level of the battery.

In accordance with another aspect of an embodiment of the present invention, a computing device is provided that includes a battery and a connected standby controller. The connected standby controller is programmed to cycle the computing device between a connected standby active state and a connected standby idle state, and set the duration of the connected standby idle state based at least in part on a charge level of the battery.

In accordance with another aspect of an embodiment of the present invention, a computer readable medium having computer readable instructions for performing a method is provided. The method includes managing power consumption of a computing device that has a battery by cycling the computing device between a connected standby active state and a connected standby idle state, and setting the duration of the connected standby idle state based at least in part on a charge level of the battery.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Various embodiments of a computing device and software operable to manage a connected standby state for the computing device are disclosed. In one variant, the computing device has a battery. The computing device is programmed or arranged to cycle between a connected standby active state and a connected standby idle state, and set the duration of the connected standby idle state based at least in part on a charge level of the battery. In an embodiment, the computing device includes a connected standby controller and algorithm code operable to implement the connected standby state control. Additional details will now be described.

Figure 1:
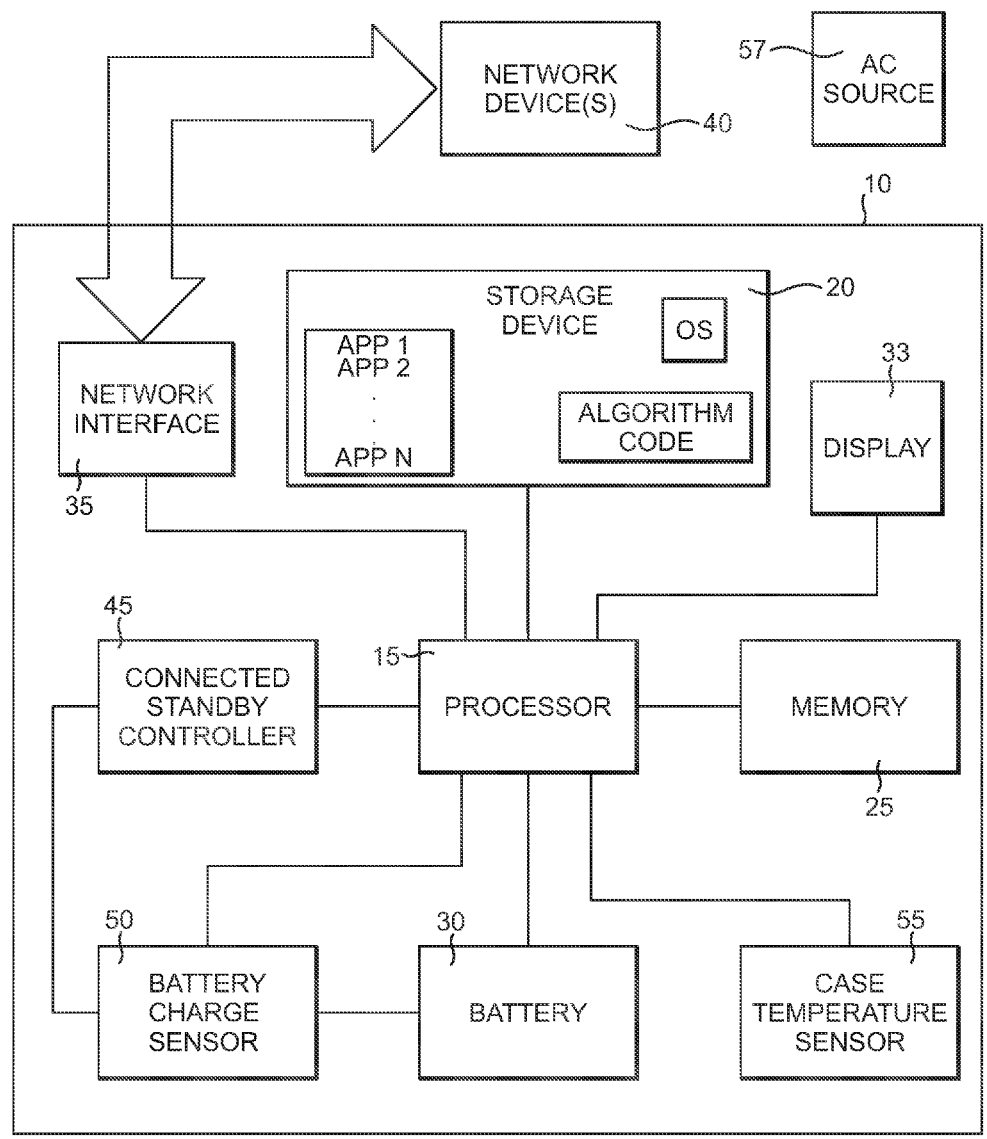
FIG. 1 is a system block diagram of an exemplary embodiment of a computing device.

In the drawings described below, reference numerals are generally repeated where identical elements appear in more than one figure. Turning now to the drawings, and in particular to FIG. 1 is a system block diagram of an exemplary embodiment of a computing device 10 that includes a processor 15, a storage device 20, a memory 25, a battery 30 and a network interface 35 that is operable to provide bi-directional communications with a network device or devices 40. In addition, the computing device 10 includes a connected standby controller (CSB) 45 which, as described in more detail below, may be a stand alone integrated circuit, part of the processor 15 or other integrated circuit of the computing device 10 or be implemented as software in the form of a driver or other type of assemblage of code stored on or off the computing device 10. In addition, some optional components include a battery charge sensor 50, a case temperature sensor 55 and an AC power source 57. Again the battery charge sensor 50 may be a discrete integrated circuit or a component of another portion of the computing device such as for example the processor 15.

The processor 15 may be a microprocessor, a graphics processor, a combined microprocessor/graphics processor, an application specification integrated circuit or other type of integrated circuit. The storage device 20 is a computer readable medium and may be any kind of hard disk, optical storage disk, solid state storage device, ROM, RAM or virtually any other system for storing computer readable media.

The storage device 20 may be populated with plural applications, which are abbreviated APP1, APP2 . . . APPn, as well as an operating system OS and ALGORITHM CODE, which may be designed to implement the selected behavior of the connected standby controller 45 to be described below. The various pieces of code may be loaded into the memory 25 as needed. Windows®, Linux, or more application specific types of operating system software may be used or the like.

The network interface 35 may be a wired or wireless connection and as such may be for example an ethernet connection either wired or wireless or near field communication or some other type of network interface. The network device or devices 40 may be a computer, a local or cloud server, a smart television, or virtually any other type of electronic device that may benefit from networked communications.

Figure 2:
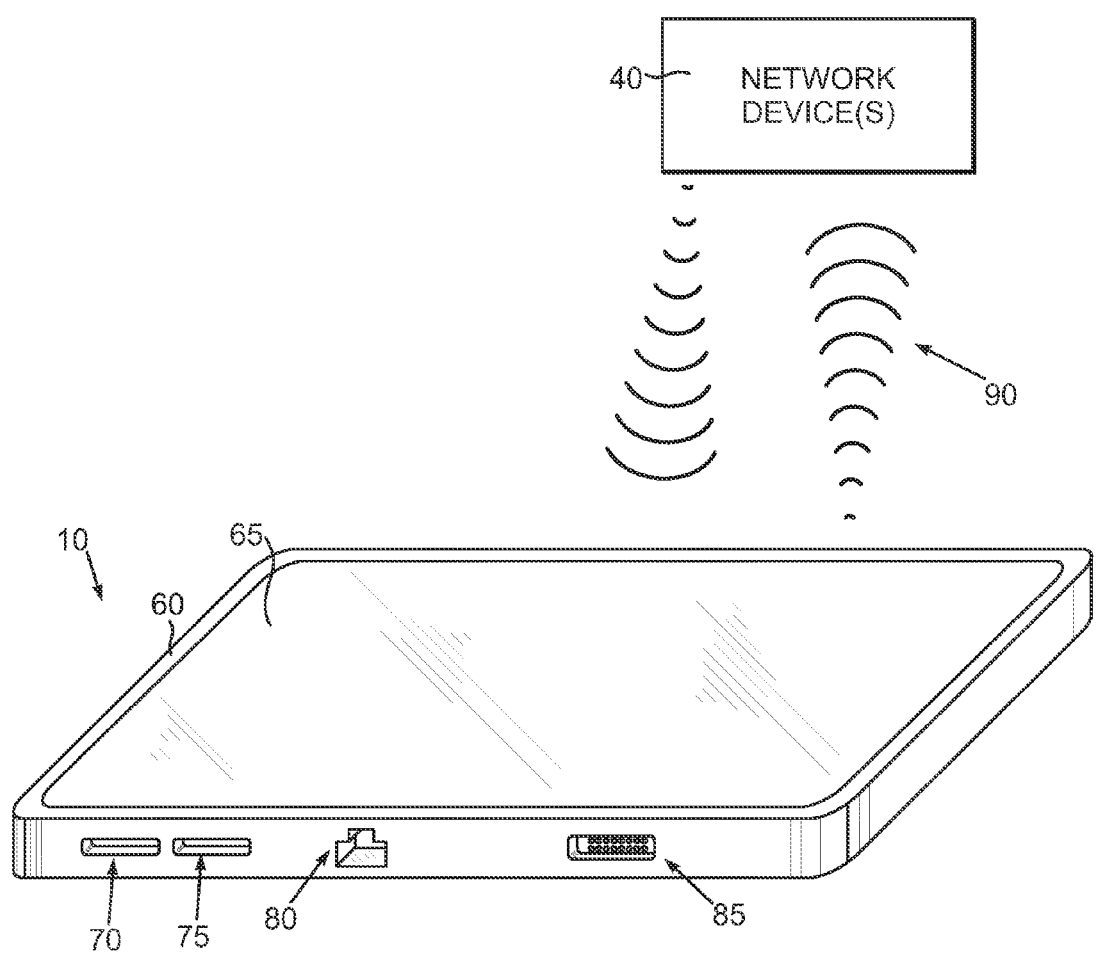
FIG. 2 is a pictorial view of an exemplary embodiment of a computing device.

The computing device 10 may take on a virtually limitless number of form factors. Examples include tablet computers, smart phones, hand held computers, remote controls or others. In one exemplary embodiment depicted pictorially in FIG. 2, the computing device 10 may be a tablet computer that includes a case 60 and a screen 65. The screen 65 may be touch enabled or not as desired. The computing device 10 as a tablet computer may include multiple ports. A few exemplary ports are depicted, such as the USB 3.0 ports 70 and 75, a wired ethernet port 80 and a video port 85. The computing device 10 may be operable to establish bi-directional wireless communication 90 with the network device or devices 40. The computing device 10 may include a wireless transmitter that is not visible. Again it should be understood that FIG. 2 simply illustrates one of the many possibilities of a physical implementation of the computing device 10.

Figure 3:
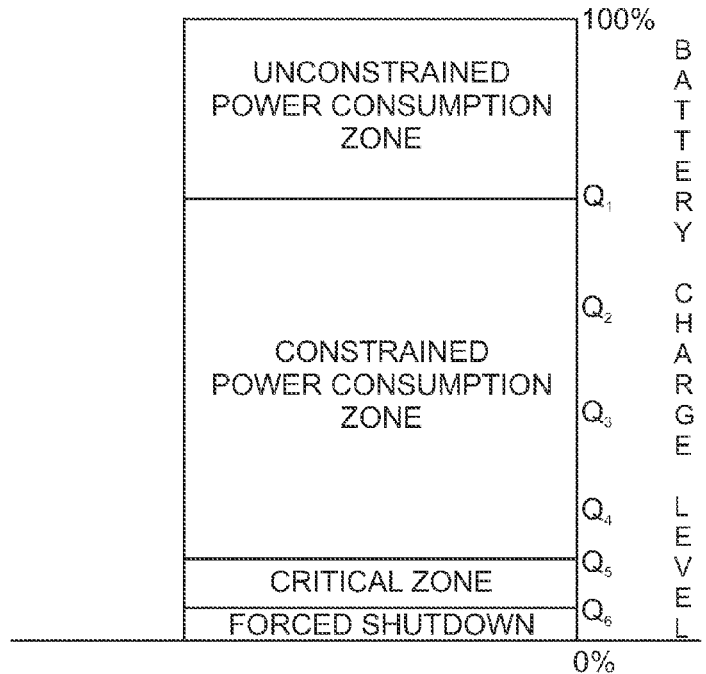
FIG. 3 is a bar chart of an exemplary set of battery charge zones for an exemplary battery for an exemplary computing device.

The behavior of the computing device 10 depicted in FIG. 1 may be modified according to the charge level of the battery 30. Still referring to FIG. 1 and referring also to the bar chart depicted in FIG. 3, the battery charge level may be subdivided into different operating zones, with different operating rules for each. In this exemplary embodiment, there are four main zones between 100% battery charge and 0% battery charge, namely: (1) an Unconstrained Power Consumption Zone between 100% charge and charge level $Q_1$; (2) a Constrained Power Consumption Zone between charge levels $Q_1$ and $Q_5$, with additional optionally-tracked charge levels $Q_2$, $Q_3$ and $Q_4$ between charge levels $Q_1$ and $Q_5$; a Critical Zone between charge levels $Q_5$ and $Q_6$; and a Forced Shutdown zone at charge level $Q_6$. When the batter charge level is between 100% and $Q_1$, there is sufficient power in the battery 30 such that the computing device 10 may operate in a virtually unconstrained manner. If, however, the charge level falls into the Constrained Power Consumption Zone, then the algorithm code can operate to modify the behavior of the computing device 10 to conserve power. Part of this modification of the operating characteristics of the computing device 10 may involve the manipulation of various aspects of the computing device 10 operation in relation to the entry and exit from a connected standby state as described in more detail below. The tracked charge levels $Q_2$, $Q_3$ and $Q_4$ provide additional granularity to the power conservation device behavior modifications. There may be fewer or more than the two additional tracked levels $Q_2$, $Q_3$ and $Q_4$. When the battery charge level falls to the level $Q_5$ and thus Critical Zone, drastic actions may be taken by the computing device 10 to conserve power. Some of these actions will be explained in detail below. Finally, when the battery charge level reaches $Q_6$, a forced shutdown may result.

Figure 4:
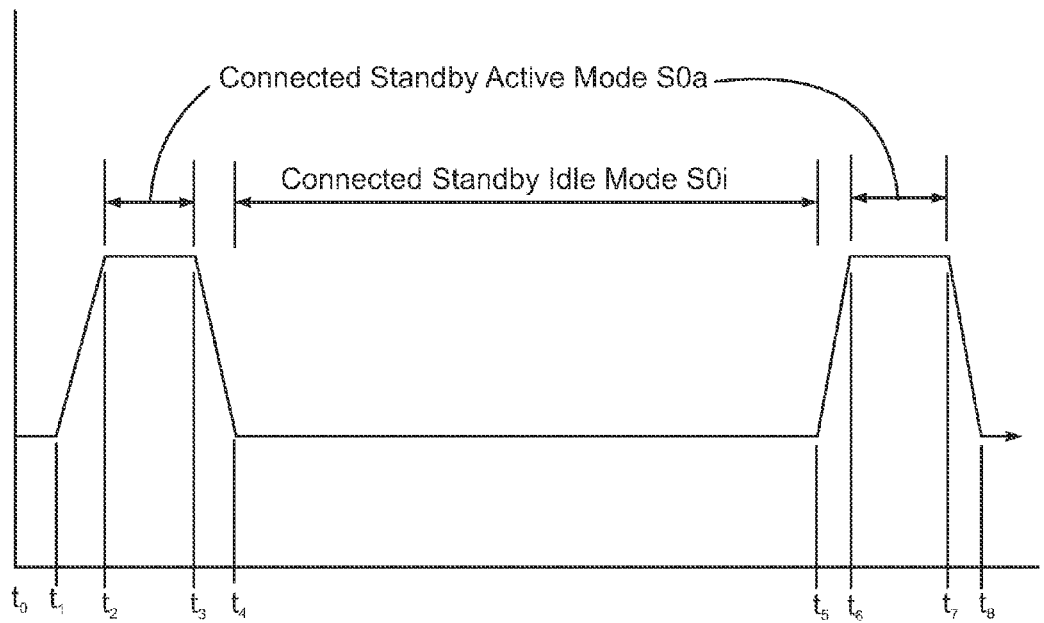
FIG. 4 is a timing diagram depicting an exemplary cycling between a connected standby active state and a connected standby idle state.

The connected standby state will now be described in conjunction with FIG. 1 and the timing diagram depicted in FIG. 4. As a connected standby (CSB) platform, the computing device 10 is operable to be very low power consumption, always-on and always network connected platform that enables communication applications to be always up-to-date, and available with minimum energy. The desired user experience is for the computing device 10 to be responsive and always available to the user, with users pertinent information, and operate for days without having to recharge the battery 30. The computing device 10 may accomplish the desired user experience with tight power management of all platform compute, graphics, display and other device resources, minimizing power use when resources and devices are not needed, and only making resources available when the user activities need them. From the point of view of the OS, the computing device 10 in the CSB state appears to be in a sleep or S0 state. In actuality, the computing device 10 may be in an interruptible loop consisting of an CSB active state S0a and a CSB idle state S0i. Referring to FIG. 4, at some time $t_1$ after initial time $t_0$, entry into CSB active state S0a is commenced. After some brief latency $t_2-T_1$, the computing device 10 is operating in CSB active state S0a. During the CSB active state S0a, which may last for a couple of seconds or some other period suitable for the particular computing device involved, any active applications, say APP1, APP2 . . . APPn, can synchronize their structures and thus maintain network associativity. Network associativity is necessary for the user to avoid extra latencies in synching up their network running applications. After synch-up is completed at time $t_3$, the computing device 10 transitions into (or back into as the case may be) the CSB idle state S0i, with period $t_4-t_3$ representing the S0i state entry latency. While in the CSB idle state S0i, the display 33 may be turned off, and some or all of the processor 15 and the network interface 35 may power down. Other components may be shut off or otherwise powered down. In the absence of any wake up events, the computing device 10 remains in the CSB idle state S0i for the period $t_5-t_4$. The length of the period $t_5-t_4$ may be modified in response to battery charge level and other considerations to be described below. One exemplary default value for the CSB idle state S0i duration $t_5-t_4$ is about 10 seconds. Some exemplary wake up events that will provoke the computing device 10 to exit the CSB idle state S0i include movement of a system power button, a signal from a wake up timer, connection of a peripheral or connection of a storage medium, such as an SD card. There may be many others. The OS is unaware of the transitions between S0a and S0i, which can reduce OS induced wake up latency. Still referring to FIG. 4, assuming no wake up events, the computing device 10 begins the transition back to the CSB active state S0a at time $t_5$, and reaches it at time $t_6$ with a latency of $t_6-t_5$. The cycle repeats through times $t_7$ and $t_8$ and so on. This cycling between the CSB active state S0a and the CSB idle state S0i will continue so long as there are no wake up events or other activity which require wake up states.

Figure 5:
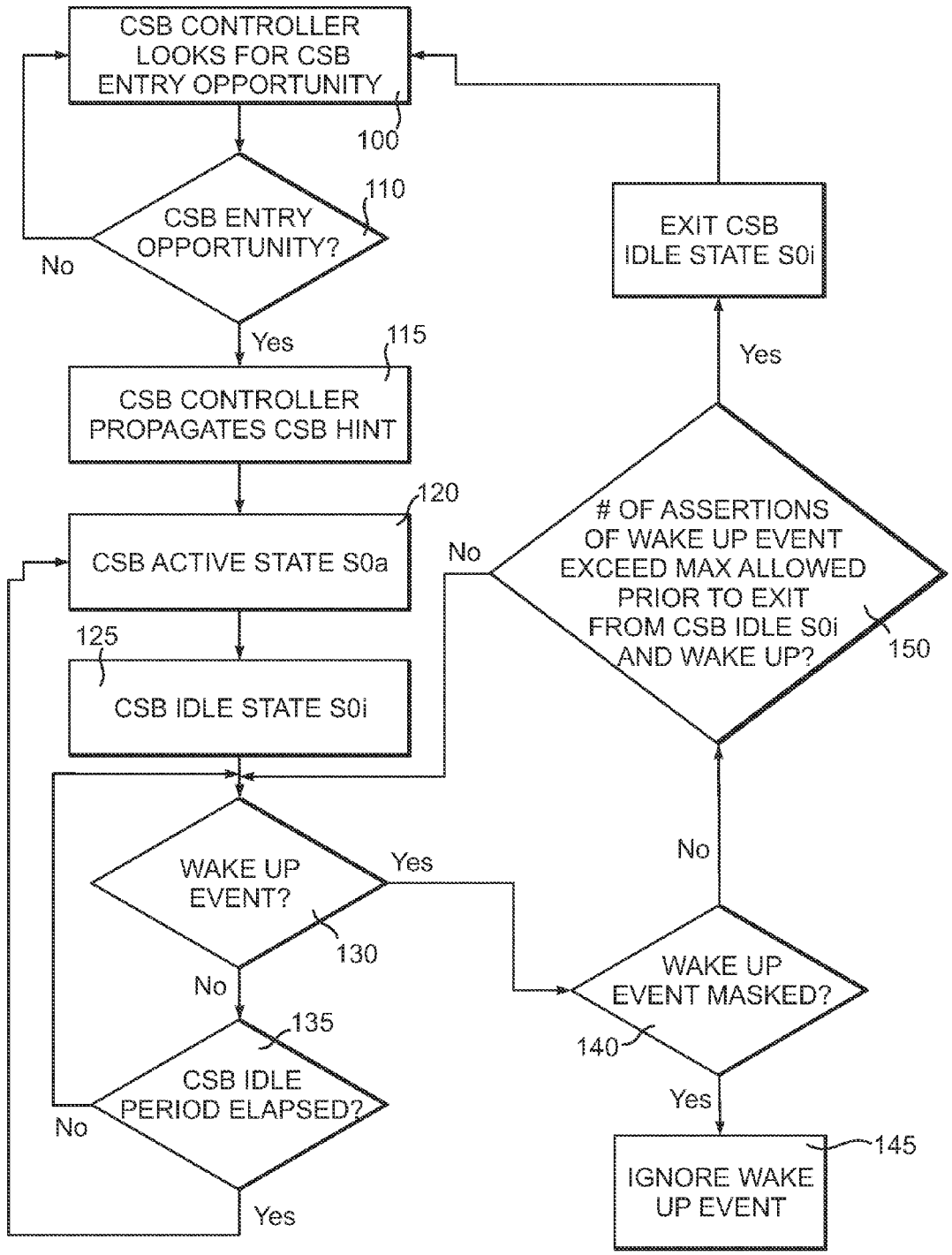
FIG. 5 is a flow chart depicting exemplary steps of managing connected standby active and idle state entry and exit.

An exemplary process flow for the entry into and exit from the interruptible loop consisting of the CSB active state S0a and idle state S0i just described may be understood by referring now to FIG. 1 and to the flow chart depicted in FIG. 5. At step 100 in FIG. 5, the CSB controller 45 in FIG. 1 looks for a CSB entry opportunity. Software, for example the OS or a plug in or other type of code, makes an identification of device idleness. For example, the OS may make a determination that the network interface 35 is idle, the applications APP1, APP2 . . . APPn are idle, and there are no incoming data packets from the network device(s) 40. If a CSB entry opportunity is not seen at step 110 then step 100 is repeated where the CSB controller 45 continues to look for a CSB entry opportunity. If, however, at step 110 a CSB entry opportunity is observed by the CSB controller 45, then the CSB controller 45 propagates a CSB hint at step 115. The CSB hint at step 115 is an instruction or set of instructions propagated to various portions of the computing device 10 to prepare for entry into the CSB active state S0a. After the CSB hint is propagated at step 115, the CSB active state S0a is entered at step 120. As noted above in conjunction with FIG. 4, the duration of the S0a active state may be about two seconds in an exemplary embodiment, however, this duration may be tailored according to device requirements. At step 125, the CSB idle state S0i state is entered. As noted above, in conjunction with FIG. 4, this period corresponds to the period $t_5$-$t_4$ in FIG. 4.

While in the CSB idle state S0i at step 125, the computing device 10 may be subject to a variety of wake up events. The management of those wake up events will now be described in conjunction with FIG. 5. At step 130 the CSB controller 45 checks for the presence of awake up event. If no wake up event is received then at step 135, the CSB controller 45 determines if the CSB idle state S0i period (e.g., $t_5$-$t_4$ in FIG. 4) has elapsed. For example, the CSB idle state S0i period $t_5$-$t_4$ may be about 10 seconds in an exemplary embodiment, though other values may be used as well. Indeed, the CSB idle state S0i period may be modified in response to battery charge level, case temperature or other inputs. Lower battery charge levels may prompt the CSB controller 45 to increase length of the CSB idle state S0i period.

Still referring to FIG. 5, if the CSB idle state S0i period has not elapsed at step 135 then a return is made to step 130 to determine if another wake up event has occurred. This loop will continue so long as no wake up events are encountered and so long as the CSB idle state S0i period has not elapsed at step 135. However, if at step 135 the CSB idle state S0i period has elapsed then step 120 is repeated and the CSB active state S0a is again entered for the period $t_3$-$t_2$ shown in FIG. 4 and the loop is repeated to step 125 and 130, etc. If, however, at step 130 a wake up event is encountered then at step 140 the CSB controller 45 determines if the wake up event has been masked by the OS or other code associated with the computing device 10. If at step 140 a determination is made that the wake up event is masked then at step 145 the wake up event is ignored. If, however, it is determined at step 140 that the wake up event is not masked, then at step 150 another conditional is encountered. At step 150, the number of assertions of the wake up event is counted and if that count exceeds a prior maximum set earlier by the CSB controller 45 for that particular type of wake up event then at step 155, the CSB idle state S0i is exited and the process returns to step 100 where the CSB controller 45 continues to look for a CSB entry opportunity. If, however, at step 150 the CSB controller 45 determines that the number of assertions of the wake up event has not exceeded the maximum allowed for that event, then the CSB controller 45 returns to step 130 polling for the next wake up event. This cycle proceeds continuously while the computing device 10 is in operation.

Figure 6:
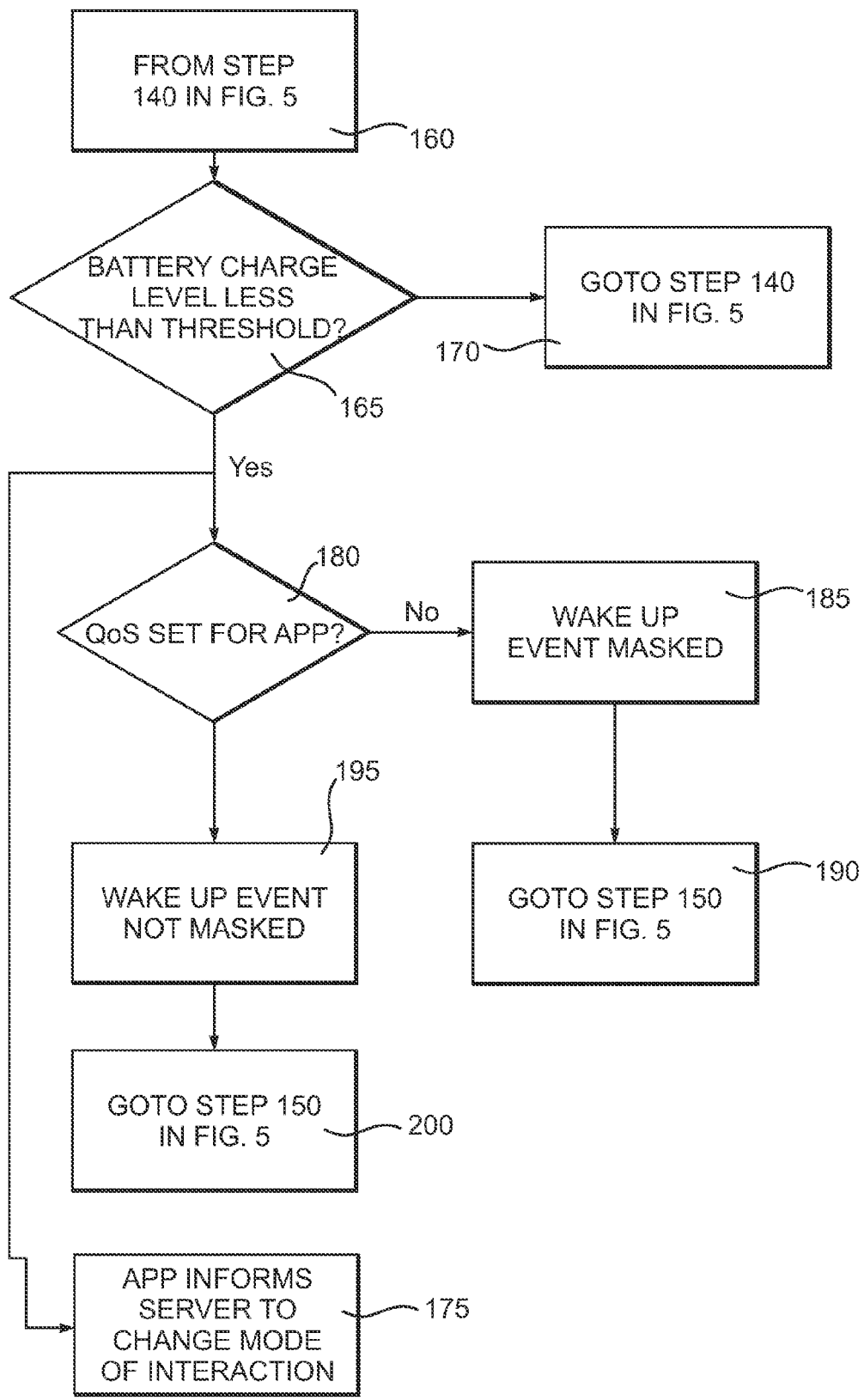
FIG. 6 is a flow chart depicting additional exemplary steps of managing connected standby active and idle state entry and exit.

The CSB controller 45 may mask off a particular wake up event based on the charge level of the battery 30. For example, if the battery charge level reaches $Q_2$ in FIG. 3, the CSB controller 45 may elect to mask wake up events associated with email push to the computing device 10. Similarly, the CSB controller 45 may elect to mask wake up events associated with a phone finder application when the battery charge level reaches $Q_3$ in FIG. 4, but leave battery alarm signals unmasked. The determination of whether or not a particular wake up event is masked and how the system responds to that determination is described in greater detail now in conjunction with FIG. 1 and the flow chart depicted in FIG. 6. Step 160 in FIG. 6 begins with the results of the conditional in step 140 of FIG. 5. Thus, whether or not the wake up event is masked at step 140 in FIG. 5, the next determination made by the CSB controller 45, at step 165, is whether the battery charge level is less than some threshold. This may be a determination for example as to whether or not the battery charge is at level $Q_1$, $Q_2$ or $Q_3$ shown in FIG. 3. If at step 165, the battery charge level is not less than some threshold, then the computing device 10 at step 170 proceeds back to step 140 in FIG. 5. If, however, at step 165, the battery level charge is less than some threshold, say less than $Q_3$ in FIG. 3, then the CSB controller 45 may take multiple courses of action. For example, an active application, like APP1, may inform a server to change a mode of interaction at step 175. The APP1 may ping the network device(s) 40 a server or vice versa. In the latter case, the network device(s) 40 may have to wait longer for the computing device 10 device to wake if its wake up events are masked or unmasked but not yet numbering above the threshold discussed in conjunction with step 150 in FIG. 5. In this instance, the application APP1 may inform the network device(s) 40 of the power state of the computing device 10 so that network device(s) will know to limit pings, which might otherwise deplete the battery 30 even further. In addition, a determination is made at step 175 as to whether or not the OS or the CSB controller 45 has set a quality of service or QoS for the particular application APP1 that is responsible for the wake up event. Some applications may be entitled to a certain level of quality of service, which is not negotiable, in which case the CSB controller 45 controller has to obligate. If a QoS has not been set for the particular application APP1 at step 175 then at step 185 the wake up event is masked and at step 190, a return to step 150 in FIG. 5 is initiated. If, however, at step 180 that a QoS has been set for the application APP1 then at step 195, the wake up event is not masked and at step 200 a return to step 150 in FIG. 5 is initiated. This cycle of steps in FIG. 6 will be repeated again and again. It should be noted that all masked wake up events may eventually be serviced.

Referring again to FIGS. 1, 3 and 4, a temperature of the computing device 10 may be monitored by, for example the case temperature sensor 55, and used as a basis to modify the CSB state entry and exit parameters. Higher temperatures increase power consumption due to leakage. In such cases, it may be appropriate for the CSB controller 45 to take extra power savings steps, such as changing the charge level thresholds (e.g., $Q_2$ or $Q_3$) that trigger changes in the CSB idle state S0i period. The charge level thresholds may be raised for higher temperatures and vice versa. Similarly, the length of the CSB idle state S0i period ($t_5$-$t_4$ in FIG. 4) may be lengthened and/or the number of assertions of an unmasked wake up event increased for higher temperatures or vice versa. While case temperature could be used, the temperature measurement used for CSB controller behavior could be made by the processor 15 or other component of computing device 10 and of temperatures other than the case temperature.

A given user's usage habits can be taken into account by the CSB controller 45 so that CSB state entry and exit parameters reflect other than simply default settings. For example, User A might regularly recharge the battery 30 shown in FIG. 1 every 24 hours. User B might take a more haphazard approach and recharge the battery 30 after three days one week and after six days the next. The ALGORITHM CODE can allow the CSB controller 45 to keep a rolling average of the time interval between battery recharges. Where the rolling average is, for example, about 24 hours for User A, the CSB controller 45 can be less aggressive with power savings tactics. The battery charge level thresholds (e.g., $Q_2$ or $Q_3$) that trigger changes in the CSB idle state S0i period or other parameters can be lowered since the battery 30 will likely be recharged in less than a day. For User B, the rolling average of time periods between charges will be longer, and prompt the CSB controller 45 to be more aggressive in the types of power savings modifications described herein.

Still referring to FIG. 1, the CSB controller 45 and the ALGORITHM CODE can react differently when the computing device 10 is operating on DC versus AC power. In DC mode, the CSB controller 45 will be necessarily more aggressive in employing the savings tactics described herein. However, even on AC power, the CSB controller 45 can use the same sorts of tactics to reduce energy consumption and perhaps heat generation, albeit with less restrictions on CSB state entry/exit and other parameters.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of managing power consumption of a computing device having a battery, comprising:
    cycling the computing device between a connected standby active state and a connected standby idle state; and
    setting the duration of the connected standby idle state based at least in part on a charge level of the battery; and
    running an application on the computing device and instructing the application to limit its activities to the connected standby active state wherein the application is operable to cause the computing device to communicate with a network device, the method including causing the application to communicate the battery charge level to the network device and modifying the interaction between the computing device and the network device in response to the communicated battery charge level.

2. The method of claim 1, wherein the duration is increased when the battery charge level falls to a selected level.

3. The method of claim 1, comprising preventing the application from activity during the connected standby idle state.

4. The method of claim 1, comprising setting a quality of service level of the application.

5. The method of claim 1, comprising setting the duration of the connected standby idle state based at least in part on a temperature of the computing device.

6. The method of claim 1, comprising setting the duration of the connected standby idle state based at least in part on an anticipated elapsed time before the battery is recharged.

7. The method of claim 1, wherein the computing device includes a connected standby controller operable to sense wake up events, the method including having the connected standby controller selectively mask off some wake up events and leave other wake up events unmasked based at least in part on the battery charge level.

8. The method of claim 7, comprising counting assertions of an unmasked wake up event and enabling the wake up event to cause exit of the connected standby idle state if the number of assertions exceeds a selected threshold.

9. A computing device, comprising:
    a battery;
    a connected standby controller programmed to cycle the computing device between a connected standby active state and a connected standby idle state, and set the duration of the connected standby idle state based at least in part on a charge level of the battery; and
    an application on the computing device, the connected standby controller being operable to instruct the application to limit its activities to the connected standby active state, wherein the application is operable to cause the computing device to communicate with a network device, the connected standby controller being operable to cause the application to communicate the battery charge level to the network device and modify the interaction between the computing device and the network device in response to the communicated battery charge level.

10. The computing device of claim 9, wherein the connected standby controller is operable to increase the duration when the battery charge level falls to a selected level.

11. The computing device of claim 9, wherein the connected standby controller is operable to prevent the application from engaging in activity during the connected standby idle state.

12. The computing device of claim 9, wherein the connected standby controller is operable to set a quality of service level of the application.

13. The computing device of claim 9, wherein the connected standby controller is operable to set the duration of the connected standby idle state based at least in part on a temperature of the computing device.

14. The computing device of claim 9, wherein the connected standby controller is operable to set the duration of the connected standby idle state based at least in part on an anticipated elapsed time before the battery is recharged.

15. The computing device of claim 9, wherein the connected standby controller is operable to sense wake up events, selectively mask off some wake up events and leave other wake up events unmasked based at least in part on the battery charge level.

16. The computing device of claim 15, wherein the connected standby controller is operable to count assertions of an unmasked wake up event and enable the wake up event to cause exit of the connected standby idle state if the number of assertions exceeds a selected threshold.

17. A computer readable medium having computer readable instructions for performing a method comprising:
    managing power consumption of a computing device having a battery by cycling the computing device between a connected standby active state and a connected standby idle state, and setting the duration of the connected standby idle state based at least in part on a charge level of the battery; and
    running an application on the computing device and instructing the application to limit its activities to the connected standby active state wherein the application is operable to cause the computing device to communicate with a network device, the method including causing the application to communicate the battery charge level to the network device and modifying the interaction between the computing device and the network device in response to the communicated battery charge level.

* * * * *